(12) United States Patent
Dimpelfeld et al.

(10) Patent No.: US 10,174,658 B2
(45) Date of Patent: Jan. 8, 2019

(54) FLOW DIVERTER TO MITIGATE DEPOSITS IN A DOSER CONE

(71) Applicant: Faurecia Emissions Control Technologies, USA, LLC, Columbus, IN (US)

(72) Inventors: Philip M. Dimpelfeld, Columbus, IN (US); Eduardo Alano, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 359 days.

(21) Appl. No.: 15/214,509

(22) Filed: Jul. 20, 2016

(65) Prior Publication Data

US 2018/0023446 A1 Jan. 25, 2018

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2610/02* (2013.01)

(58) Field of Classification Search
CPC .. F01N 3/2892; F01N 3/2066; F01N 2610/02; F01N 3/208; F01N 2240/20;
(Continued)

(56) References Cited

U.S. PATENT DOCUMENTS 8,387,393 B2 * 3/2013 Landry .................... F02C 7/22
60/737
8,438,839 B2 5/2013 Floyd et al.
(Continued)

FOREIGN PATENT DOCUMENTS

| DE | 102014205782 A1 * | 12/2014 | ............. F01N 3/208 |
| JP | 2014234815 A | 12/2014 | |
| WO | 2015187128 | 12/2015 | |

OTHER PUBLICATIONS

International Search Report for International Application No. PCT/US2016/049808 dated Apr. 20, 2017.
(Continued)

*Primary Examiner* — Phutthiwat Wongwian
*Assistant Examiner* — Kelsey Stanek
(74) *Attorney, Agent, or Firm* — Carlson, Gaskey & Olds, P.C.

(57) ABSTRACT

A mixer for a vehicle exhaust system includes a mixer housing that defines an interior cavity for engine exhaust gases, and which includes a doser opening formed within a wall of the mixer housing. A cone has a cone inlet opening aligned with the doser opening and a cone outlet into the interior cavity. A cylindrical member surrounds at least a portion of the cone and includes at least one window opening. At least one diverter duct is fixed to the mixer housing and has a first duct end open to the interior cavity and a second duct end at least partially overlapping the at least one window opening such that a portion of the engine exhaust gases in the interior cavity is directed to enter the first duct end, flow through the at least one window and then flow into the cone inlet opening to be mixed with a fluid injected through the doser opening.

14 Claims, 9 Drawing Sheets

(58) Field of Classification Search
CPC .. F01N 2610/1453; B01F 5/0057; B01F 5/00; B01F 5/0062; B01F 5/0065; B01F 5/0074; B01F 5/0471; B01F 5/0486; B01F 5/049; B01F 2005/002; B01F 2005/0017; B01F 2005/0045
USPC .......... 60/301, 295, 324; 422/168, 176; 366/165.1, 165.2
See application file for complete search history.

(56) References Cited

U.S. PATENT DOCUMENTS

| | | |
|---|---|---|
| 8,756,921 B2 | 6/2014 | Troxler et al. |
| 8,800,276 B2 | 8/2014 | Levin et al. |
| 8,813,481 B2 | 8/2014 | Kowada |
| 2011/0113759 A1* | 5/2011 | Tilinski ................ F01N 3/2066 60/295 |
| 2011/0308234 A1* | 12/2011 | De Rudder ......... B01F 3/04049 60/295 |
| 2012/0090305 A1 | 4/2012 | Floyd et al. |
| 2013/0239546 A1 | 9/2013 | Levin et al. |
| 2013/0333363 A1 | 12/2013 | Joshi et al. |
| 2015/0101313 A1 | 4/2015 | Mitchell et al. |
| 2015/0198073 A1 | 7/2015 | Jujare et al. |

OTHER PUBLICATIONS

International Search Report and Written Opinion for International Application No. PCT/US2017/020314 dated Jun. 20, 2017.

* cited by examiner

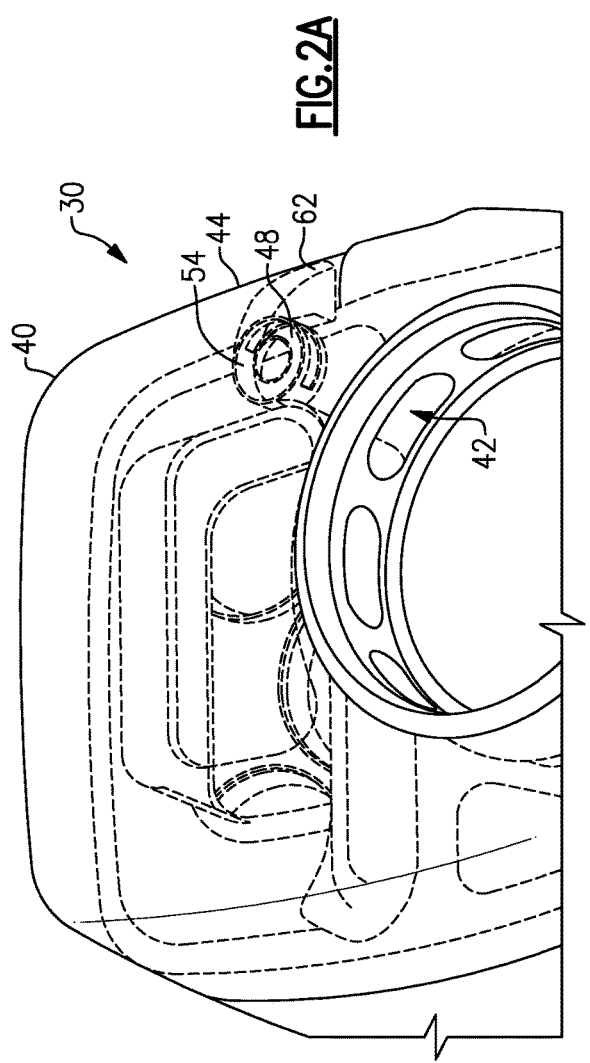
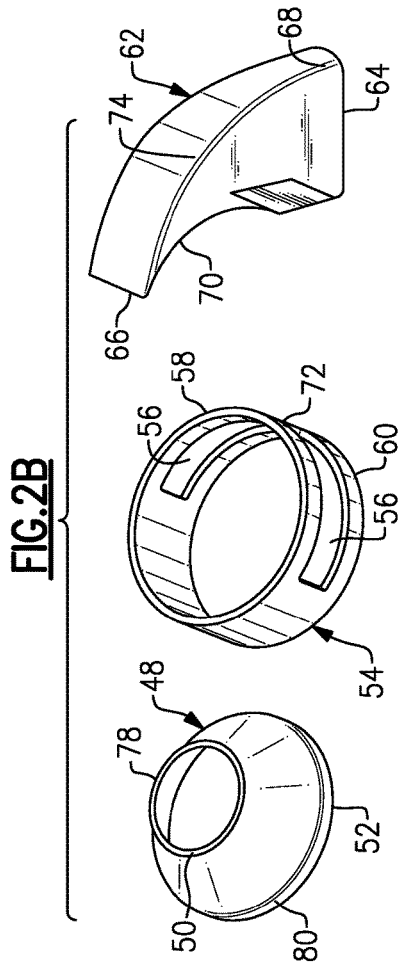
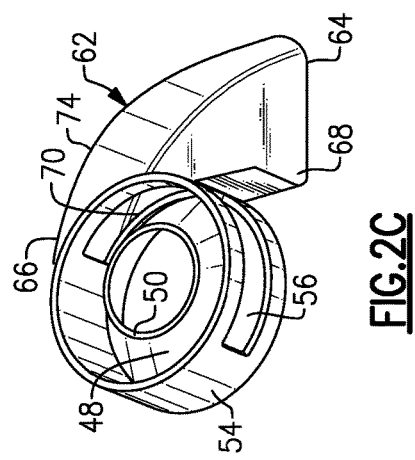
FIG.2A
FIG.2B
FIG.2C

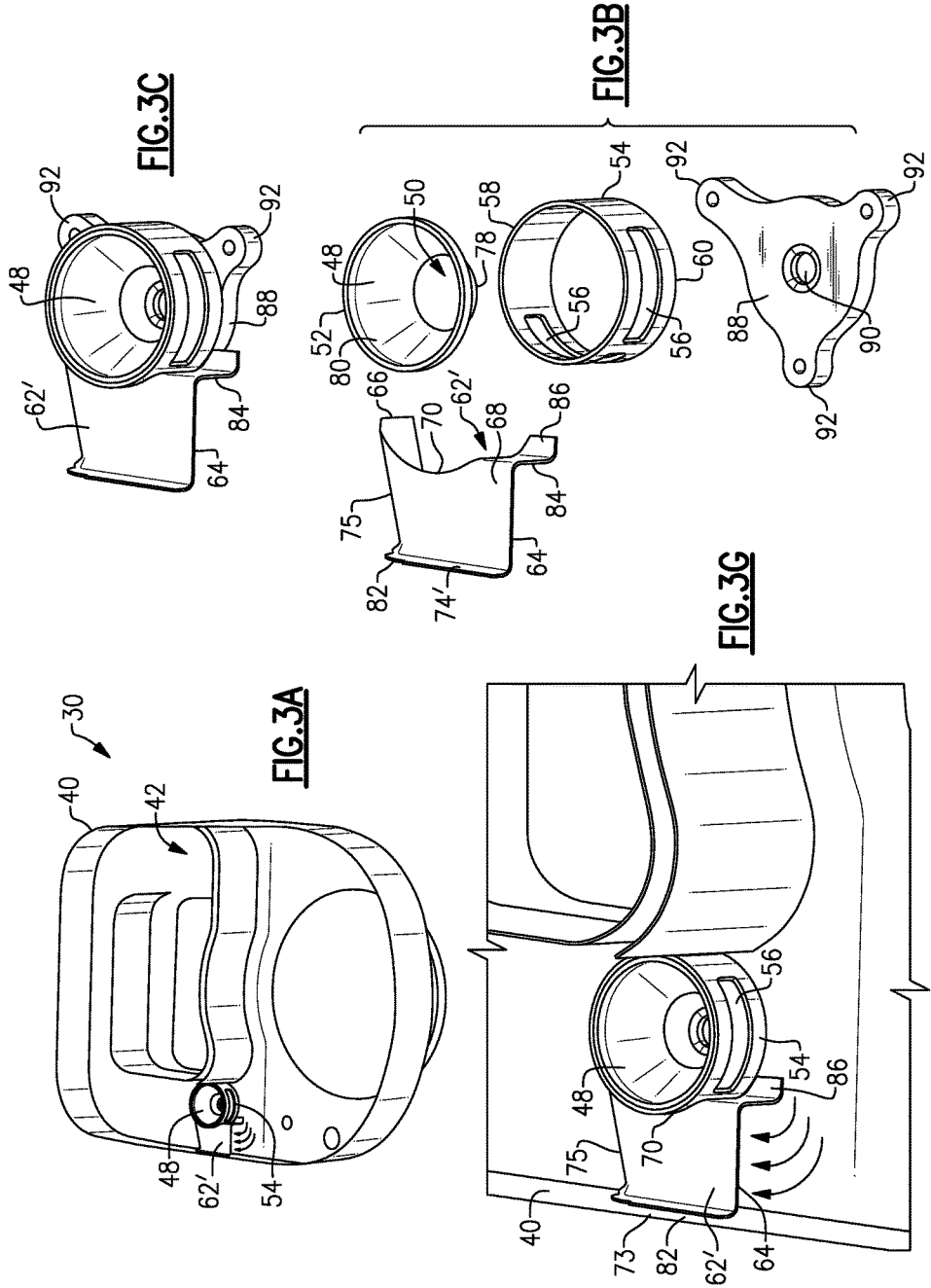

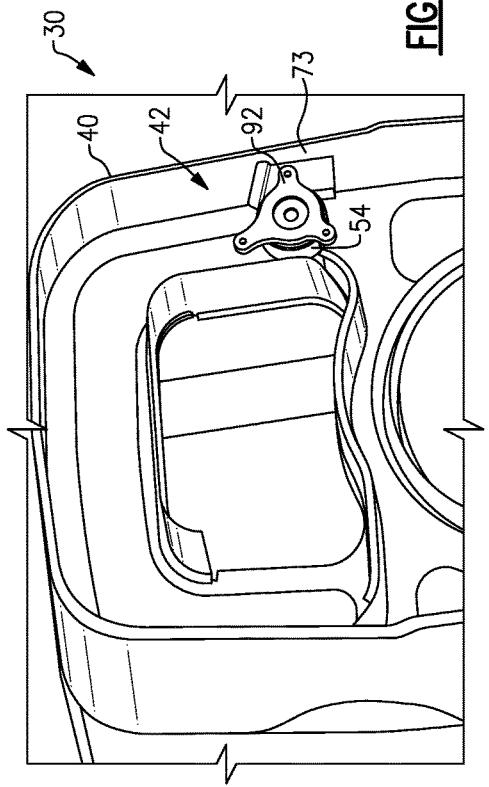
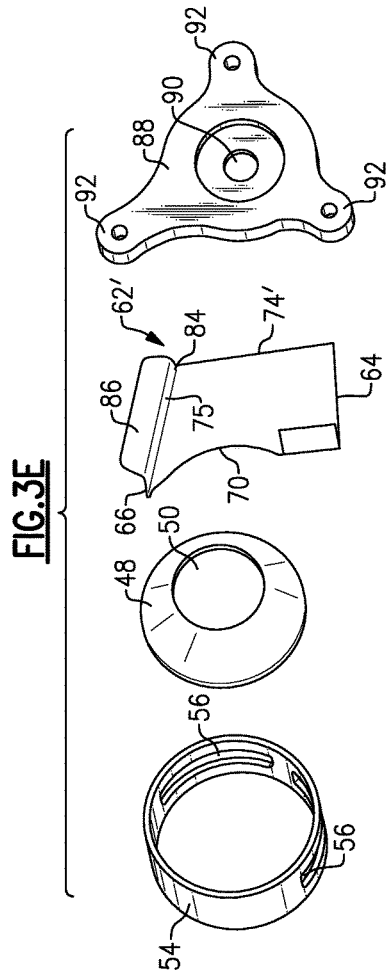
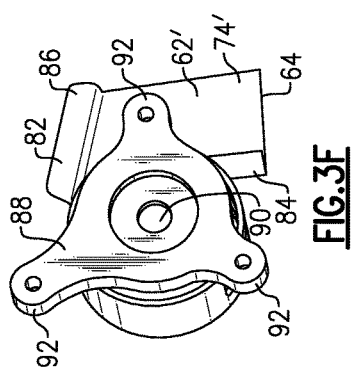

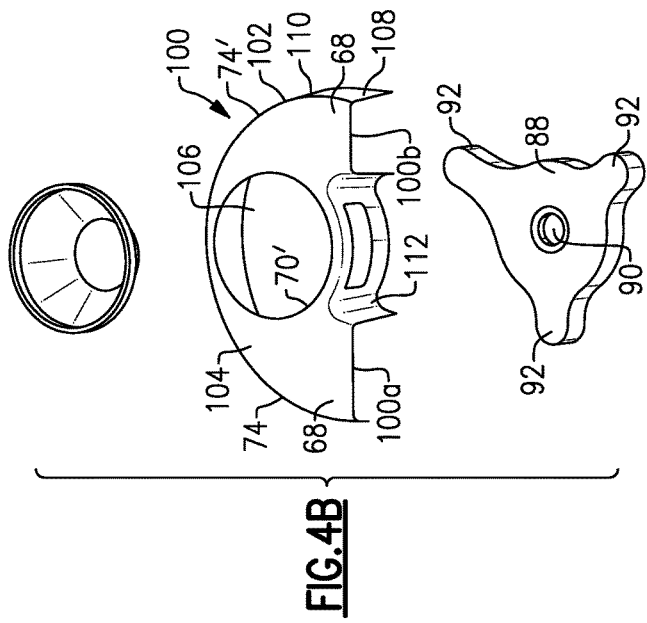
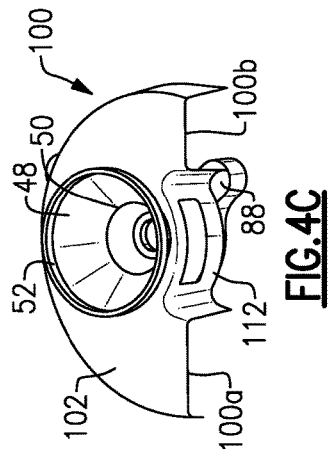
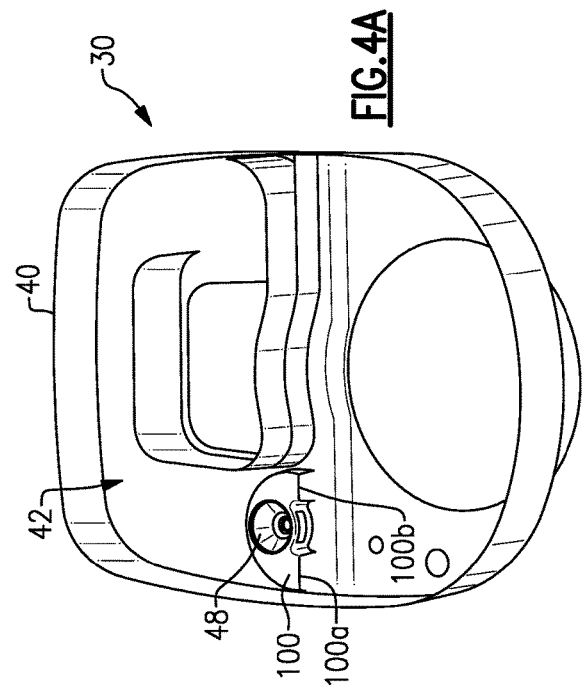
FIG.4B
FIG.4C
FIG.4A

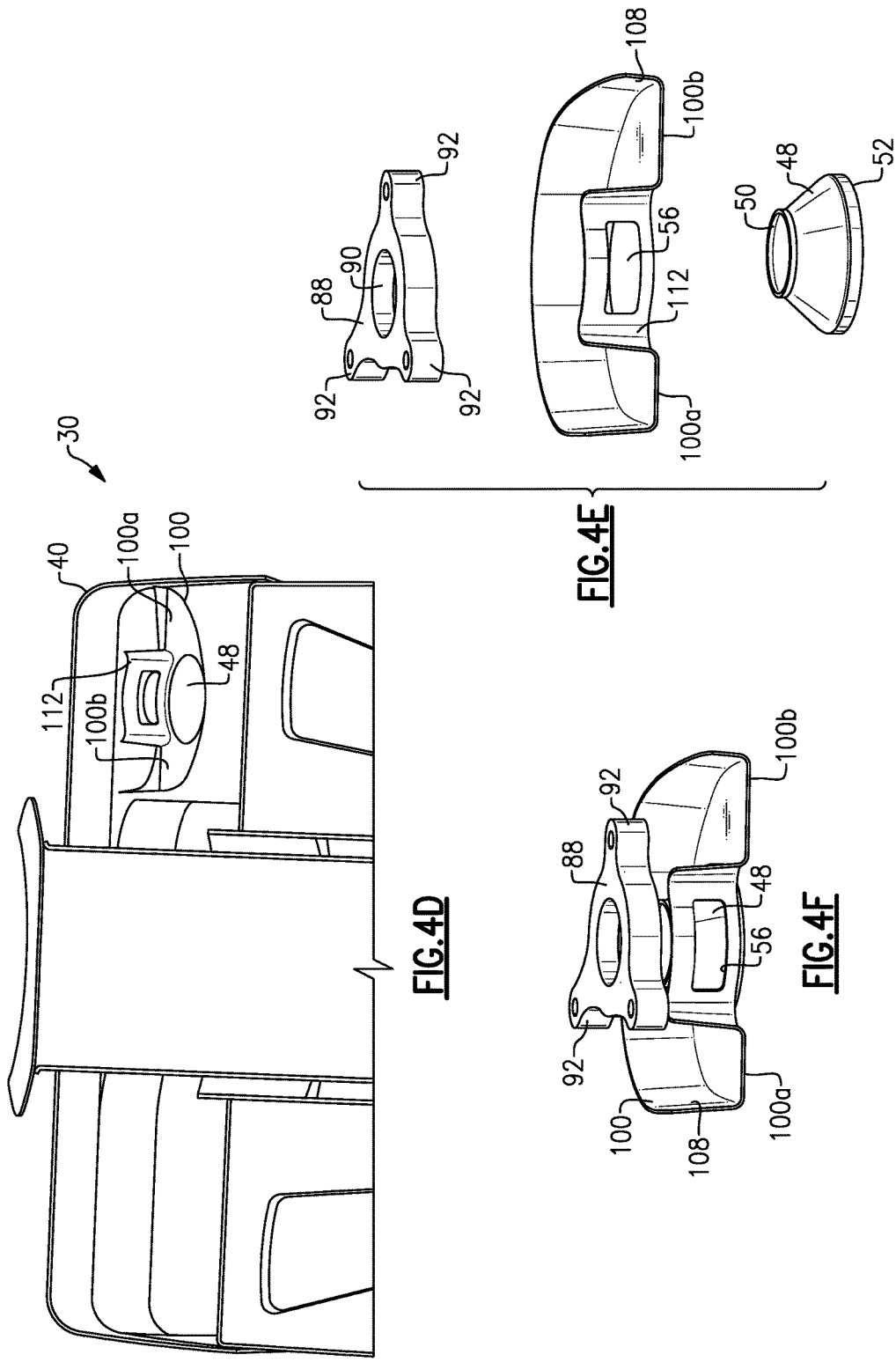

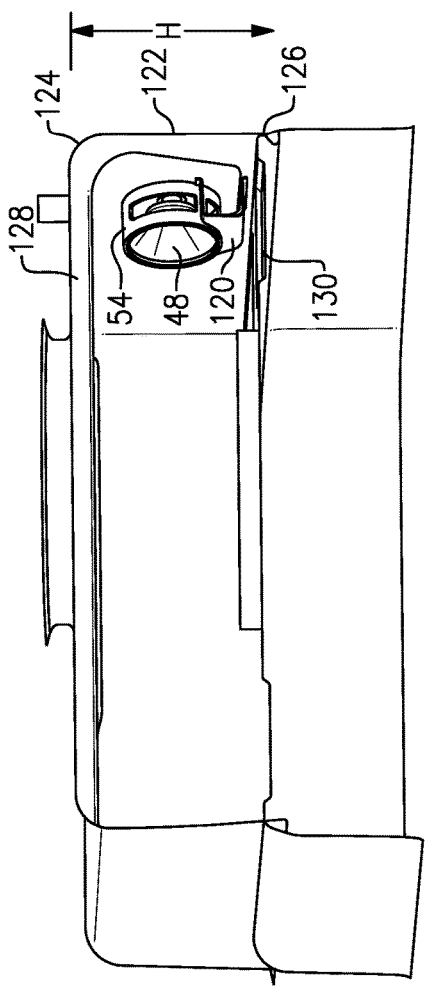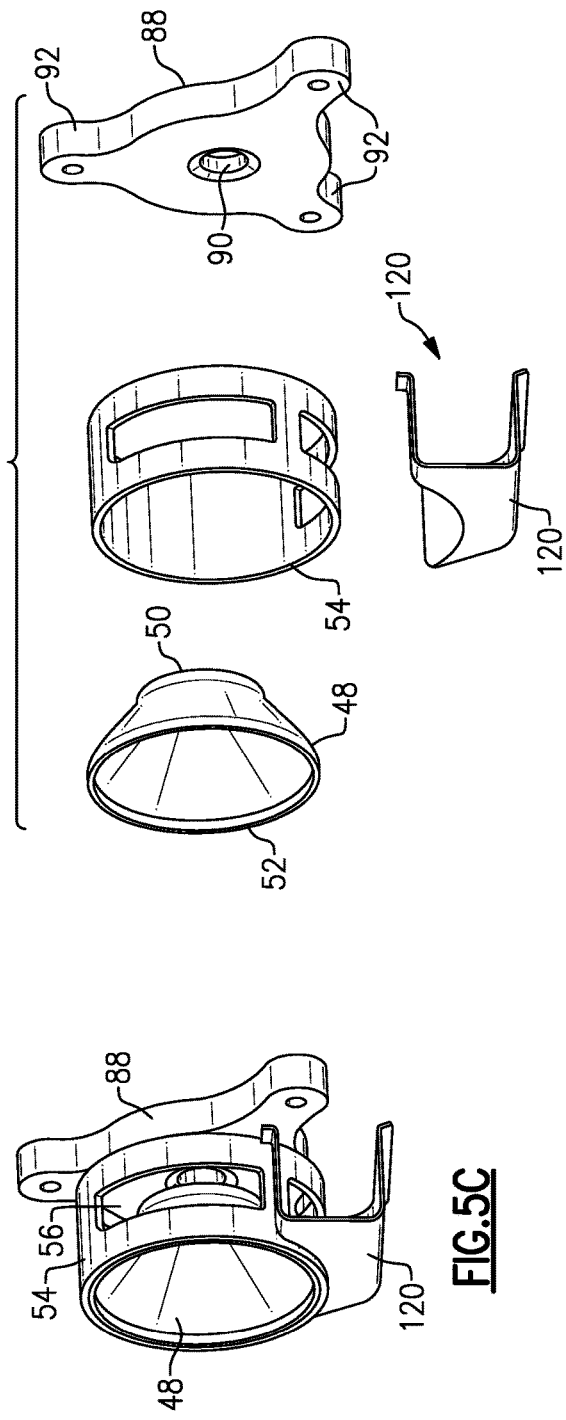

FLOW DIVERTER TO MITIGATE DEPOSITS IN A DOSER CONE

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF) or a reducing agent, such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

In one known configuration, the mixer includes a housing with an opening that receives the doser. A cone is aligned with this opening to provide a widening spray area into the internal cavity of the outer housing. The widening spray area facilitates a more thorough distribution of spray droplets over a larger area as the spray enters the exhaust gas stream.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. In configurations that utilize a cone, deposit initiation sites have been found on the wall of the cone. The deposits in these sites build up over time and can adversely affect system operation.

SUMMARY OF THE INVENTION

In one exemplary embodiment, a mixer for a vehicle exhaust system includes a mixer housing that defines an interior cavity for engine exhaust gases, and which includes a doser opening formed within a wall of the mixer housing. A cone has a cone inlet opening aligned with the doser opening and a cone outlet into the interior cavity. A cylindrical member surrounds at least a portion of the cone and includes at least one window opening. At least one diverter duct is fixed to the mixer housing and has a first duct end open to the interior cavity and a second duct end at least partially overlapping the at least one window opening such that a portion of the engine exhaust gases in the interior cavity is directed to enter the first duct end, flow through the at least one window and then flow into the cone inlet opening to be mixed with a fluid injected through the doser opening.

In a further embodiment of the above, the cone comprises a body having a base end defining the cone inlet opening and an outlet end defining the cone outlet opening, and wherein at least a portion of the body increases in diameter in a direction extending from the base end toward the outlet end.

In a further embodiment of any of the above, the base end is spaced apart from an inner surface of the mixer housing that surrounds the doser opening to create a gap between the base end of the cone and the mixer housing to allow exhaust gases exiting the at least one window opening to flow into the gap and enter the cone inlet opening.

In a further embodiment of any of the above, the diverter duct includes a scoop portion formed at the first duct end and an attachment portion formed at the second duct end, and wherein the attachment portion is fixed to an outer surface of the cylindrical member.

In a further embodiment of any of the above, the attachment portion comprises a curved profile that matches a curved surface of the cylindrical member.

In a further embodiment of any of the above, the at least one diverter duct comprises a single diverter duct.

In a further embodiment of any of the above, the at least one diverter duct comprises a double diverter duct with a first diverter duct being positioned adjacent the cone and a second diverter duct being positioned adjacent the cone.

These and other features of this application will be best understood from the following specification and drawings, the following of which is a brief description.

BRIEF DESCRIPTION OF THE DRAWINGS

FIG. 2A is top view of a portion of a mixer with a cone assembly that includes the subject invention.

FIG. 2B is an exploded view of the cone assembly of FIG. 2A.

FIG. 2C is a perspective view of the cone assembly of FIG. 2B.

FIG. 3A is top view of a portion of a mixer with another example of a cone assembly that includes the subject invention.

FIG. 3B is an exploded view of the cone assembly of FIG. 3A.

FIG. 3C is a perspective view of the cone assembly of FIG. 3B.

FIG. 3D is a bottom view of the cone assembly of FIG. 3C.

FIG. 3E an exploded view of the cone assembly of FIG. 3B but viewed from an opposite side.

FIG. 3F is a perspective view of the cone assembly of FIG. 3C but viewed from an opposite side.

FIG. 3G is an enlarged view of a portion of FIG. 3A.

FIG. 4A is top view of a portion of a mixer with another example of a cone assembly that includes the subject invention.

FIG. 4B is an exploded view of the cone assembly of FIG. 4A.

FIG. 4C is a perspective view of the cone assembly of FIG. 4B.

FIG. 4D is a bottom view of the cone assembly of FIG. 4C.

FIG. 4E an exploded view of the cone assembly of FIG. 4B but viewed from an opposite side.

FIG. 4F is a perspective view of the cone assembly of FIG. 4C but viewed from an opposite side.

FIG. 5A is top view of a portion of a mixer with another example of a cone assembly that includes the subject invention.

FIG. 5B is an exploded view of the cone assembly of FIG. 5A.

FIG. 5C is a perspective view of the cone assembly of FIG. 5B.

DETAILED DESCRIPTION

Figure 1:
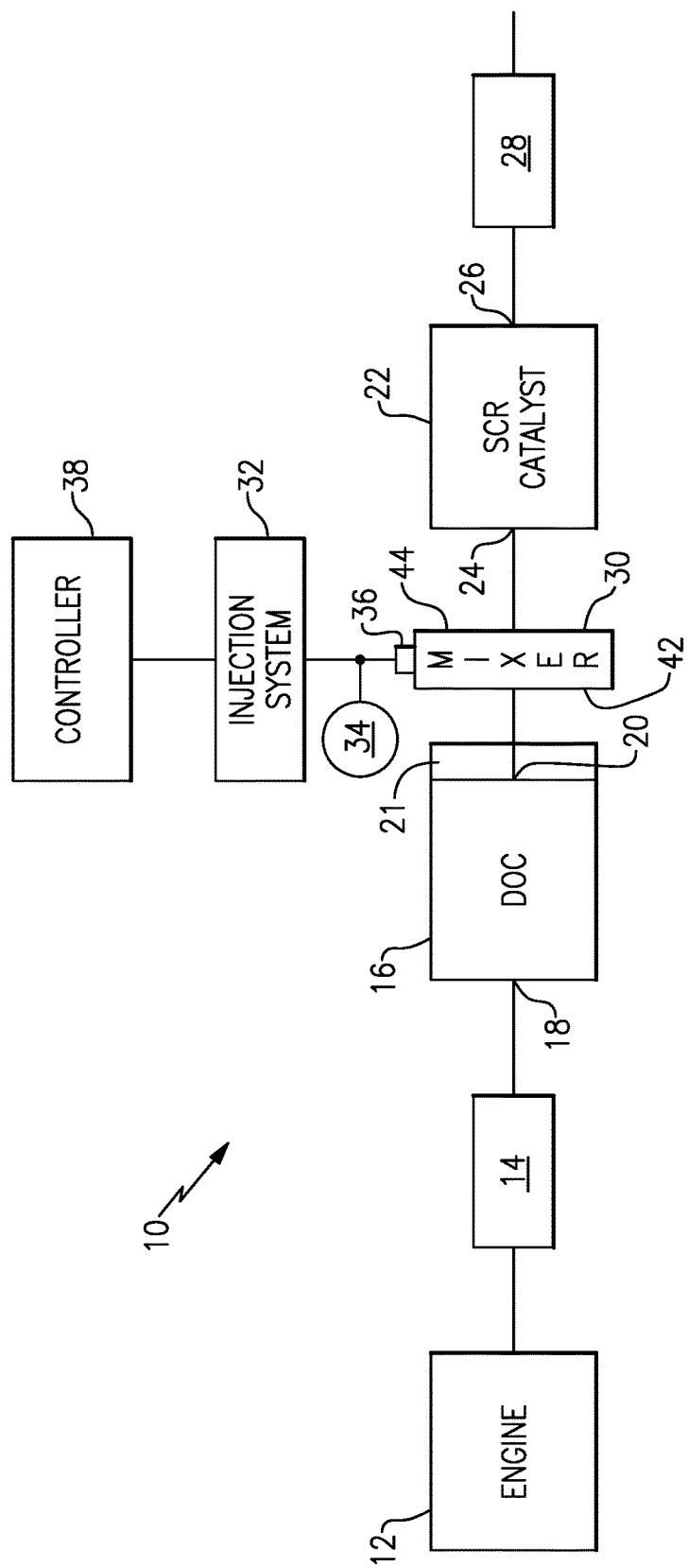
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct exhaust gases into a diesel oxidation catalyst (DOC) 16 having an inlet 18 and an outlet 20. Downstream of the DOC 16 is an optional component 21 that may be a diesel particulate filter (DPF), which is used to remove contaminants from the exhaust gas as known. Downstream of the DOC 16 and optional component 21 is a catalyst component 22, such as a selective catalytic reduction (SCR) for example, having an inlet 24 and an outlet 26. The positions of the inlet 24 and outlet 26 are just examples and the locations may vary.

In this example, an exhaust system pipe will drive the exhaust flow to the catalyst component 22. The outlet 26 communicates exhaust gases to downstream exhaust components 28. Optionally, catalyst component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or component 21 and upstream of the inlet 24 of the SCR catalyst 22. The upstream catalyst and downstream catalyst can be in-line, in parallel or any other configuration. The mixer 30 (as shown in the in-line configuration) is used to generate a swirling or rotary motion of the exhaust gas. An injection system 32 is used to inject a gaseous or liquid reducing agent, such as a solution of urea and water for example, into the exhaust gas stream upstream from the SCR catalyst 22 such that the mixer 30 can mix the injected substance and exhaust gas thoroughly together. In an example, the injection system 32 includes a fluid supply 34, a doser 36, and a controller 38 that controls injection of the reducing agent as known. Optionally, component 36 can be a pipe of introduction of gaseous reducing agent. Operation of the controller 38 to control injection of the reducing agent is known and will not be discussed in further detail.

One example of a mixer 30 that utilizes the subject invention is shown in FIGS. 2A-2E. The mixer 30 includes a mixer housing 40 that defines an interior cavity 42 for receiving the engine exhaust gases. An outer peripheral wall 44 of the housing 40 includes an opening 46 (FIG. 2D) that is configured to receive the doser 36. A cone 48 has a cone inlet opening 50 aligned with the doser opening 46 and a cone outlet opening 52 into the interior cavity 42.

A cylindrical member 54 surrounds at least a portion of the cone 48. In one example, the cylindrical member 54 comprises a pipe. The cylindrical member 54 includes one or more window openings 56. In the example shown, the cylindrical member 54 includes two window openings 56. The cylindrical member 54 has an overall height defined as the distance between a top edge 58 and a bottom edge 60. The window openings 56 are formed within a wall of the cylindrical member 54 at a location that is between the top edge 58 and bottom edge 60. In one example, the window openings 56 comprise a rectangular shape and extend circumferentially about the cylindrical member 54. The window openings; however, could also have different shapes and/or sizes.

At least one diverter duct 62 is fixed to the mixer housing 40 and has a first duct end 64 open to the interior cavity 42 and a second duct end 66 at least partially overlapping the at least one window opening 56 such that a portion of the engine exhaust gas in the interior cavity 42 is directed to enter the first duct end 64, flow through the at least one window 56 and then flow into the cone inlet opening 50 to be mixed with a fluid injected through the doser opening 46.

The diverter duct 62 includes a scoop portion 68 formed at the first duct end 64 and an attachment portion 70 formed at the second duct end 66. The attachment portion is fixed to an outer surface 72 of the cylindrical member 54. The attachment portion 70 comprises a curved profile that matches a curved surface 72 of the cylindrical member 54.

In the example shown in FIGS. 2A-2E, the at least one diverter duct 62 comprises a single diverter duct 62 that is installed within the mixer 30. Further, in this example, the diverter duct 62 has a curved profile 74 formed opposite the curved profile of the attachment portion 70 wherein the curved profile 74 comprises the scoop portion 68.

Figure 2D:
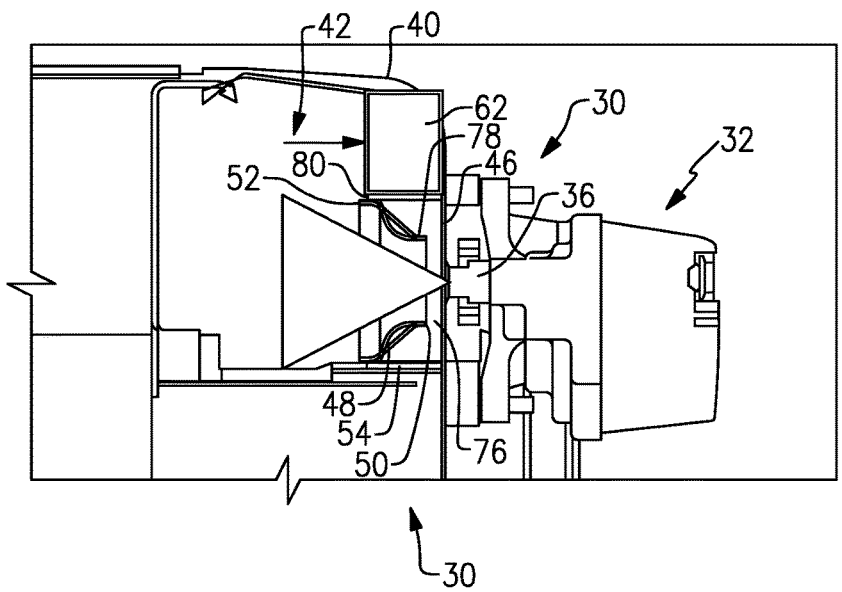
FIG. 2D is a schematic side view of an injector as used with the cone assembly of FIG. 2C.
Figure 2E:
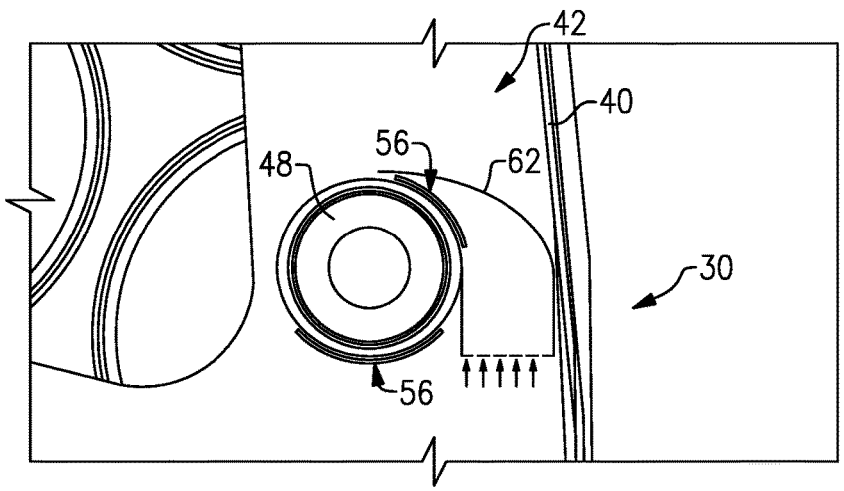
FIG. 2E is a schematic top view of the cone assembly of FIG. 2D showing a diverter duct flow path.

The cone 48 comprises a body having a base end 78 defining the cone inlet opening 50 and an outlet end 80 defining the cone outlet opening 52. At least a portion of the body increases in diameter in a direction extending from the base end 78 toward the outlet end 80. The base end 78 is spaced apart from an inner surface of the mixer housing 40 that surrounds the doser opening 46 to create the gap 76 between the base end 78 of the cone 48 and the mixer housing 40 to allow exhaust gases exiting the at least one window opening 56 to flow into the gap 76 and enter the cone inlet opening 50 (FIG. 2D). The body of the cone 48 includes a first portion at the base end 78 and a second portion that extends from the base end 78 to the outlet end 80. The first portion at the base end 78 comprises a cylindrical portion defined by first outer diameter and the second portion comprises a tapering portion having an increasing diameter from the first portion toward the outlet end 80.

In this type of mixer configuration, the exhaust gas flows past the doser 36 in primarily one direction. To ensure that exhaust gas is flowing into the cone 46 in a desired manner, the diverter duct 62 scoops and directs the exhaust gas to bring the exhaust gas to the inlet opening 50 of the cone 48. This prevents a buildup of urea deposits on the cone 48, which can adversely affect the operating efficiency of the mixer 30. The scoop portion 68 captures sufficient exhaust flow and delivers this flow into a gap 76 between the cone 48 and an inner surface of the wall 44 of the mixer 30. The use of the diverter duct 62 results in a net positive flow of approximately 3%-5% of the total exhaust through the cone 48. Further, there is no leakage of exhaust out of the gap 76 in an opposite direction.

In the example shown in FIGS. 3A-3F, the at least one diverter duct 62 also comprises a single diverter duct 62' that is installed within the mixer 30; however, in this configuration the diverter duct 62' includes a straight profile 74' formed opposite the curved profile of the attachment portion 70. The straight profile 74' comprises the scoop portion 68 of the duct 62'. The housing 40 forms an outer wall of the scoop as shown at 73 in FIGS. 3D and 3G. The cone 48 and the cylindrical member 54 are the same as that which was discussed above with regard to FIGS. 2A-2E. FIGS. 3A-3C show a top view of the diverter duct 62', while FIGS. 3D-3F show a bottom view of the duct 62'.

The straight profile 74' section of the duct 62' includes a flange 82 that is attached to the housing 40. The duct 62' also includes a straight back wall 75 as shown in FIGS. 3B and 3E. The attachment portion 70 includes the curved profile to be attached to the cylindrical member 54 and includes a downwardly extending leg 84 that forms part of the scoop portion 68. The leg 84 also includes a transversely extending flange 86 that is fixedly attached to the housing 40. Optionally, the transversely extending flange 86 can be removed and the legs 84 can be directly attached to the housing 40.

An injector flange 88 is also included as part of an assembled unit comprising the cone 48, cylindrical member 54, and duct 62'. The injector flange 88 includes a center opening 90 that is aligned within the doser opening 46 and a plurality of mounting legs 92 that are used to attach the doser 36 to the housing 40. The injector flange 88 can also be used in the configuration shown in FIGS. 2A-2E.

FIGS. 4A-4G show a configuration where the at least one diverter duct comprises a double diverter duct 100. In one example, the double diverter duct comprises a first diverter duct 100a being positioned on one side of the cone 48 and a second diverter duct 100b being positioned on an opposite side of the cone 48. The cone 48 and injector flange 88 are the same as described above. However, in this example, the cylindrical member 54 and the first 100a and second 100b diverter ducts are formed as a single-piece component 102. Optionally, the ducts could be separately attached in manner similar to that described above. Further, while two ducts are shown on opposite sides of the cone 48, it should be understood that the two ducts could also be on the same side of the cone 48.

The component 102 includes a base plate 104 that includes a center opening 106 that is aligned with the outlet opening 52 of the cone 48. A flange 108 extends downwardly from an outer peripheral edge 110 of the base plate 104 to form the walls for the scoop portion 68 of the ducts 100a, 100b. The center opening 106 comprises an attachment interface 70' for attachment to the cone 48.

The first 100a and second 100b ducts include a curved profile 74' formed opposite the center opening 106 of the attachment interface 70'. The curved profile 74' comprises the scoop portion 68 of the duct 62'. FIGS. 4A-4C show a top view of the diverter duct 62', while FIGS. 4D-4F show a bottom view of the duct 62'. As shown in FIG. 4E, the component 102 includes at least one window opening 56 and an inner flange portion 112 that extends downwardly for attachment to the housing 40. The window opening 56 is formed in the flange portion 112.

Figure 4G:
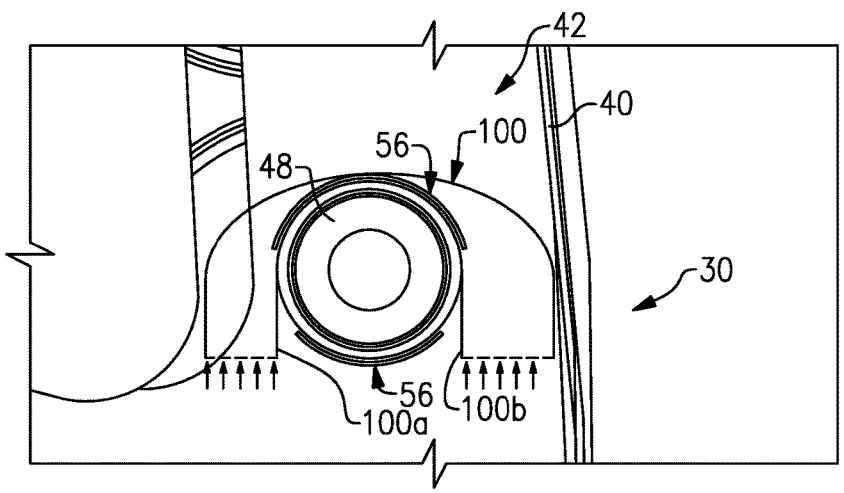
FIG. 4G is a schematic top view of the cone assembly of FIG. 4C showing a diverter duct flow path.

FIG. 4G shows the flow pattern of the exhaust gas into the ducts 100a, 100b when they are separately attached to a cylindrical member 54 with a plurality of window openings 56. The ducts 100a, 100b scoop the exhaust gas around to the sides and back of the cone 48 to prevent leakage and reduce urea deposits.

FIGS. 5A-5E show an example of smaller mini-scoop or duct 120 that allows the doser to be positioned symmetrically within the mixer 30. The mini-duct 120 is similar to that which is shown in FIGS. 3A-3F but is smaller in size. The cone 48, cylindrical member 54, and injector flange 88 are the same as that shown in FIGS. 3A-3F.

As shown in FIG. 5A, the mixer housing 40 includes an outer wall portion 122 that includes the doser opening 46. The outer wall portion 120 is defined by a first edge 124 spaced apart from a second edge 126 by a wall height H. The first edge 124 starts at an outer top wall 128 and the second end is located at an inner baffle wall 130 located within the interior cavity 42. The doser opening 46 is formed within the outer wall 122 at a location that is generally an equal distance from the first edge 124 and the second edge 126. The mini-duct 120 is positioned on an inner surface of the outer wall 122 on one side of the cone 48. Optionally, two min-ducts 120 could be used, one on each side of the cone 48.

Figure 5D:
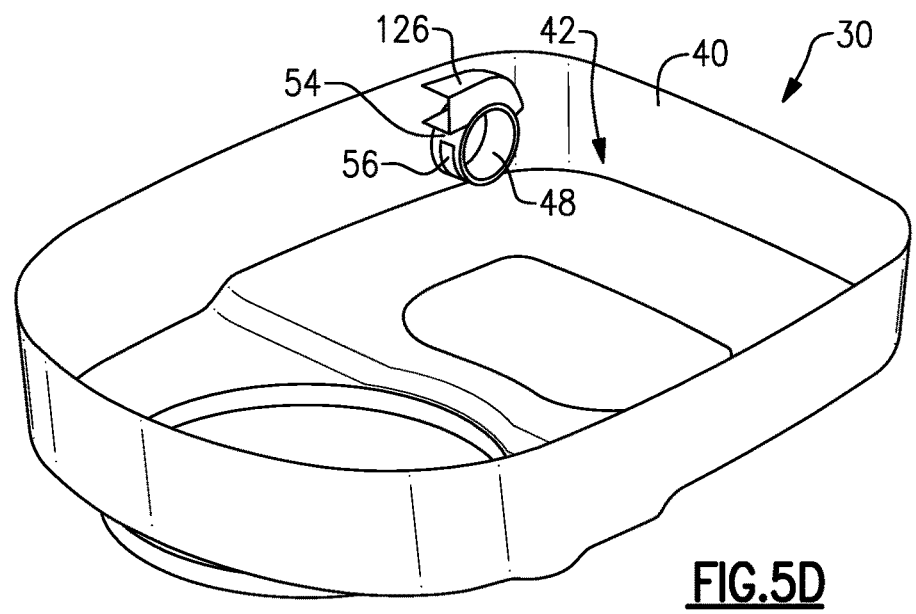
FIG. 5D shows an internal view of an alternate location for the cone assembly of FIG. 5C
Figure 5E:
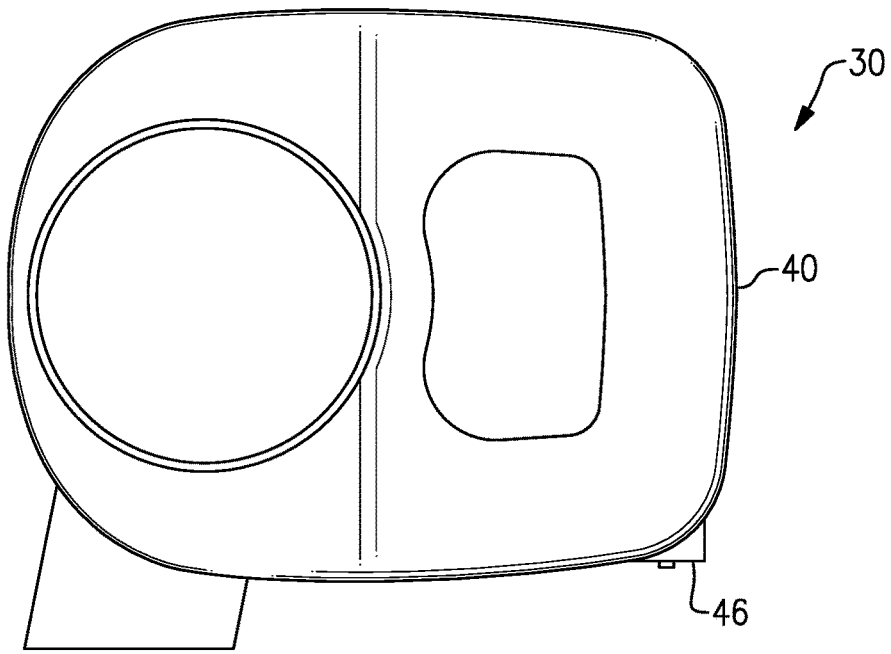
FIG. 5E shows an external view of the alternate location of FIG. 5D.

This more compact configuration allows the doser 36 and associated cone 48 to be mounted at different locations on the housing 40. As shown in FIGS. 5D and 5E, the cone is mounted in a corner of the housing 40. As discussed above, the mini-duct 120 is configured to provide for a symmetric placement within the housing to allow for more efficient mixing. When the configuration of FIG. 2A or 3A is used, the doser opening 36 is formed within the outer wall 122 a location that is closer to one of the first 124 and second 126 edges than the other of the first 124 and second 126 edges.

The subject invention provides a diverting scoop or duct that is used in combination with the doser cone to provide a sufficient quality and quantity of exhaust flow to mitigate urea deposits in the doser cone. The scoop/duct diverts or directs exhaust gas into the gap at the inlet of the cone to prevent leakage. The single, double, or mini-duct designs allow the doser to be placed in many different areas on the mixer housing to provide more design flexibility.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A mixer for a vehicle exhaust system comprising:
a mixer housing defining an interior cavity for engine exhaust gases;
a doser opening formed within a wall of the mixer housing;
a cone having a cone inlet opening aligned with the doser opening and a cone outlet opening into the interior cavity;
a cylindrical member surrounding at least a portion of the cone, the cylindrical member including at least one window opening; and
at least one diverter duct fixed to the mixer housing and having a first duct end open to the interior cavity and a second duct end at least partially overlapping the at least one window opening such that a portion of the engine exhaust gases in the interior cavity is directed to enter the first duct end, flow through the at least one window and then flow into the cone inlet opening to be mixed with a fluid injected through the doser opening.

2. The mixer according to claim 1 wherein the cone comprises a body having a base end defining the cone inlet opening and an outlet end defining the cone outlet opening, and wherein at least a portion of the body increases in diameter in a direction extending from the base end toward the outlet end.

3. The mixer according to claim 2 wherein the base end is spaced apart from an inner surface of the mixer housing that surrounds the doser opening to create a gap between the base end of the cone and the mixer housing to allow exhaust gases exiting the at least one window opening to flow into the gap and enter the cone inlet opening.

4. The mixer according to claim 3 wherein the body of the cone includes a first portion at the base end and a second portion that extends from the base end to the outlet end, the first portion comprising a cylindrical portion defined by first outer diameter and the second portion comprising a tapering portion having an increasing diameter from the first portion toward the outlet end.

5. The mixer according to claim 3 wherein the diverter duct includes a scoop portion formed at the first duct end and an attachment portion formed at the second duct end, and wherein the attachment portion is fixed to an outer surface of the cylindrical member.

6. The mixer according to claim 5 wherein the attachment portion comprises a curved profile that matches a curved surface of the cylindrical member.

7. The mixer according to claim 5 wherein the at least one diverter duct comprises a single diverter duct.

8. The mixer according to claim 5 wherein the at least one diverter duct comprises a double diverter duct with a first diverter duct being positioned adjacent the cone and a second diverter duct, separate from the first diverter duct, being positioned adjacent the cone.

9. The mixer according to claim 8 wherein the cylindrical member and the first and second diverter ducts are formed as a single-piece component.

10. The mixer according to claim 3 wherein the mixer housing includes an outer wall that includes the doser opening, and wherein the outer wall is defined by a first edge spaced apart from a second edge by a wall height, and wherein the doser opening is formed within the outer wall a location that is approximately an equal distance from the first edge and the second edge.

11. The mixer according to claim 3 wherein the mixer housing includes an outer wall that includes the doser opening, and wherein the outer wall is defined by a first edge spaced apart from a second edge by a wall height, and wherein the doser opening is formed within the outer wall a location that is closer to one of the first and second edges than the other of the first and second edges.

12. The mixer according to claim 1 including an injector flange positioned at the cone inlet opening, wherein the injector flange includes an injector opening aligned with the doser opening.

13. The mixer according to claim 1 wherein the cylindrical member comprises a pipe that is attached to the at least one diverter duct.

14. The mixer according to claim 13 wherein the at least one window opening comprises at least two window openings formed within the pipe.

* * * * *